(12) United States Patent
Zhao

(10) Patent No.: US 12,135,439 B2
(45) Date of Patent: Nov. 5, 2024

(54) LASER MODULE SYSTEM THAT INCORPORATES A PROTECTIVE LENS

(71) Applicant: TECHNOMATE MANUFACTORY LIMITED, Hong Kong (CN)

(72) Inventor: Hebing Zhao, Dongguan (CN)

(73) Assignee: Technomate Manufactory Limited, Hong Kong (CN)

( * ) Notice: Subject to any disclaimer, the term of this patent is extended or adjusted under 35 U.S.C. 154(b) by 412 days.

(21) Appl. No.: 17/570,643

(22) Filed: Jan. 7, 2022

(65) Prior Publication Data
US 2023/0221470 A1    Jul. 13, 2023

(51) Int. Cl.
*G02B 3/02*    (2006.01)
(52) U.S. Cl.
CPC ...................... *G02B 3/02* (2013.01)
(58) Field of Classification Search
CPC .................................................. G02B 3/02
USPC ........................................................ 359/719
See application file for complete search history.

(56) References Cited

U.S. PATENT DOCUMENTS

2018/0058814 A1*    3/2018    Guthrie ................. F41G 3/165

* cited by examiner

*Primary Examiner* — Wyatt A Stoffa
*Assistant Examiner* — Mitchell T Oestreich
(74) *Attorney, Agent, or Firm* — Garson & Gutierrez, PC

(57) ABSTRACT

Protective lens for a laser module as well as systems that incorporate the lens. In one embodiment, a laser module system is disclosed. The laser module system includes a light-emitting diode lighting apparatus, a laser module that includes a laser-emitting aperture having a first dimension, and a protective lens that is disposed over the light-emitting diode lighting apparatus and the laser module. The protective lens includes both a smaller diameter portion that is configured to protect the laser module and a larger diameter portion that is larger in size than the smaller diameter portion and is configured to protect the light-emitting diode lighting apparatus. The smaller diameter portion is offset by an angle with respect to the larger diameter portion with the angle of offset being configured to eliminate extraneous reflections of light from the laser-emitting aperture of the laser module.

17 Claims, 7 Drawing Sheets

SECTION C-C

LASER MODULE SYSTEM THAT INCORPORATES A PROTECTIVE LENS

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE DISCLOSURE

1. Technological Field

The present disclosure relates generally to lenses for use with laser modules, and more particularly in one exemplary aspect, to lenses for use with laser modules that eliminate extraneous light reflections from laser modules.

2. Field of the Disclosure

FIG. 1A illustrates an exemplary prior art laser module system 100 that includes a laser module 310 that is positioned adjacent a lens 110. The lens 110 is typically constructed from a translucent injection molded polymer and functions to, inter alia, protect sensitive components of the laser module 310 (and other sensitive portions of the system 100) from the external operating conditions that this system 100 may be employed. For example, the lens 110 may protect against water intrusion which can negatively affect the operation of various sensitive internal components of the laser module system 100. Dependent upon the operating or physical characteristics of the laser module 310, the light emitted from the laser module 310 through the lens 110 may result in extraneous reflections such as that shown in FIG. 1B. FIG. 1B illustrates a surface 140 that has been illuminated by the system shown in FIG. 1A. Specifically, the surface 140 has been illuminated by the laser module 310 which results in focused illumination 120. Unfortunately, the combination of the laser module 310 with the lens 110 may result in one or more extraneous illuminations 130. Accordingly, it would be desirable to have a system that offers the benefit of the system that includes both a laser module and a lens that operates without producing extraneous illuminations on the surface that the laser module is illuminating.

SUMMARY

The present disclosure satisfies the foregoing needs by providing, inter alia, a lens for use with a laser module that eliminates the extraneous illuminations present within prior art laser module systems.

In one aspect, a lens for use with a laser module is disclosed. In one embodiment, the lens includes a smaller diameter portion and a larger diameter portion that is larger in size than the smaller diameter portion. The smaller diameter portion is offset by an angle with respect to the larger diameter portion with the angle of offset being configured to eliminate extraneous reflections of light from the laser module.

In one variant, the smaller diameter portion of the protective lens is configured to be positioned over the laser module.

In another variant, the protective lens includes tangent lines that join the smaller diameter portion of the protective lens with the larger diameter portion of the protective lens.

In yet another variant, the protective lens has a uniform thickness for both the smaller diameter portion and the larger diameter portion.

In yet another variant, the angle of offset for the smaller diameter portion with respect to the larger diameter portion is approximately 6°.

In another aspect, a laser module system is disclosed. In one embodiment, the laser module system includes a light-emitting diode lighting apparatus, a laser module that includes a laser-emitting aperture of a first dimension, and a protective lens that is disposed over both the light-emitting diode lighting apparatus and the laser module. The protective lens includes a smaller diameter portion configured to protect the laser module and a larger diameter portion that is larger in size than the smaller diameter portion, the larger diameter portion being configured to protect the light-emitting diode lighting apparatus. The smaller diameter portion of the protective lens is offset by an angle with respect to the larger diameter portion, the angle of offset being configured to eliminate extraneous reflections of light from the laser-emitting aperture of the laser module.

In one variant, the angle of offset for the smaller diameter portion is sized to reflect light off the protective lens outside of the first dimension of the laser-emitting aperture of the laser module.

In another variant, the protective lens is manufactured from one or more of: a transparent sticker, polycarbonate, poly (methyl methacrylate); and glass.

In yet another variant, the first dimension of the laser-emitting aperture is approximately 2 mm and the angle of offset is greater than about 6°.

In yet another variant, the protective lens includes tangent lines that join the smaller diameter portion of the protective lens with the larger diameter portion of the protective lens.

In yet another variant, the angle of offset for the smaller diameter portion of the protective lens is selected as a function of a distance between the laser-emitting aperture and the protective lens and the first dimension of the laser-emitting aperture.

In yet another variant, the first dimension of the laser-emitting aperture is approximately 2 mm and the angle of offset is greater than about 6°.

In yet another variant, the laser-emitting aperture includes a second lens.

In yet another variant, the angle of offset for the smaller diameter portion is sized to reflect light off the protective lens outside of the second lens.

In yet another variant, a size of the second lens is approximately 2 mm in diameter and the angle of offset is greater than about 6°.

Other features and advantages of the present disclosure will immediately be recognized by persons of ordinary skill in the art with reference to the attached drawings and detailed description of exemplary implementations as given below.

BRIEF DESCRIPTION OF THE DRAWINGS

The features, objectives, and advantages of the present disclosure will become more apparent from the detailed description set forth below when taken in conjunction with the drawings, wherein.

All Figures disclosed herein are © Copyright 2021 Technomate Manufactory Limited. All rights reserved.

DETAILED DESCRIPTION

Exemplary Embodiments

Detailed descriptions of the various embodiments and variants of the apparatus and methods of the present disclosure are now provided. It is noted that wherever practicable similar or like reference numbers may be used in the figures and may indicate similar or like functionality. The figures depict embodiments of the disclosed apparatus (or methods) for purposes of illustration only. One skilled in the art will readily recognize from the following description that alternative embodiments of the structures and methods illustrated herein may be employed without necessarily departing from the principles described herein.

Exemplary Lens for Use with a Laser Module

Figure 2A:
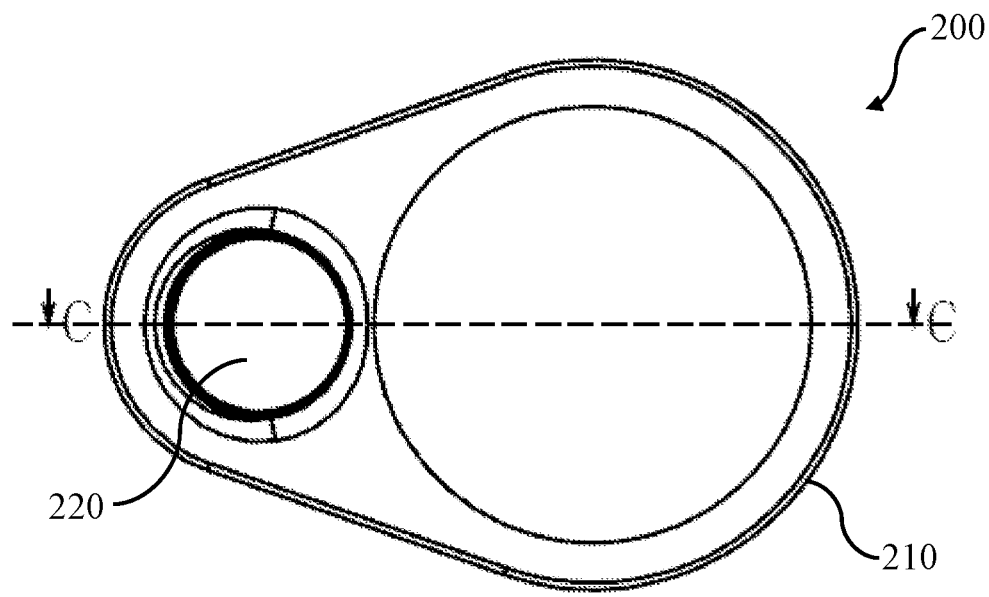
FIG. 2A is a top plan view of a lens for use with a laser module, in accordance with the principles of the present disclosure.

Referring now to FIG. 2A, a top plan view of a lens 200 for use with a laser module 310 is illustrated. In some implementations, the lens 200 is constructed from a unitary translucent injection molded polymer such as polycarbonates (PC), poly (methyl methacrylate) (PMMA), although it would be appreciated that alternative implementations may be manufactured from, for example, glass or other common optical materials. In some implementations, a translucent sticker may be used alternatively from, or in addition to, the other optical materials previously mentioned above. The outer profile 210 of the lens 200 includes the outer profile of two circles of differing diameters that are connected with one another along tangent lines that connect the circumferences of the two different diameter circles with each other. The larger diameter portion of the lens is intended to protect, for example, light-emitting diode (LED) lighting and associated sensitive electronic components. The smaller diameter portion 220 is positioned over the laser module 310 and is intended to allow the light emitted from the laser module 310 to pass therethrough.

Figure 1A:
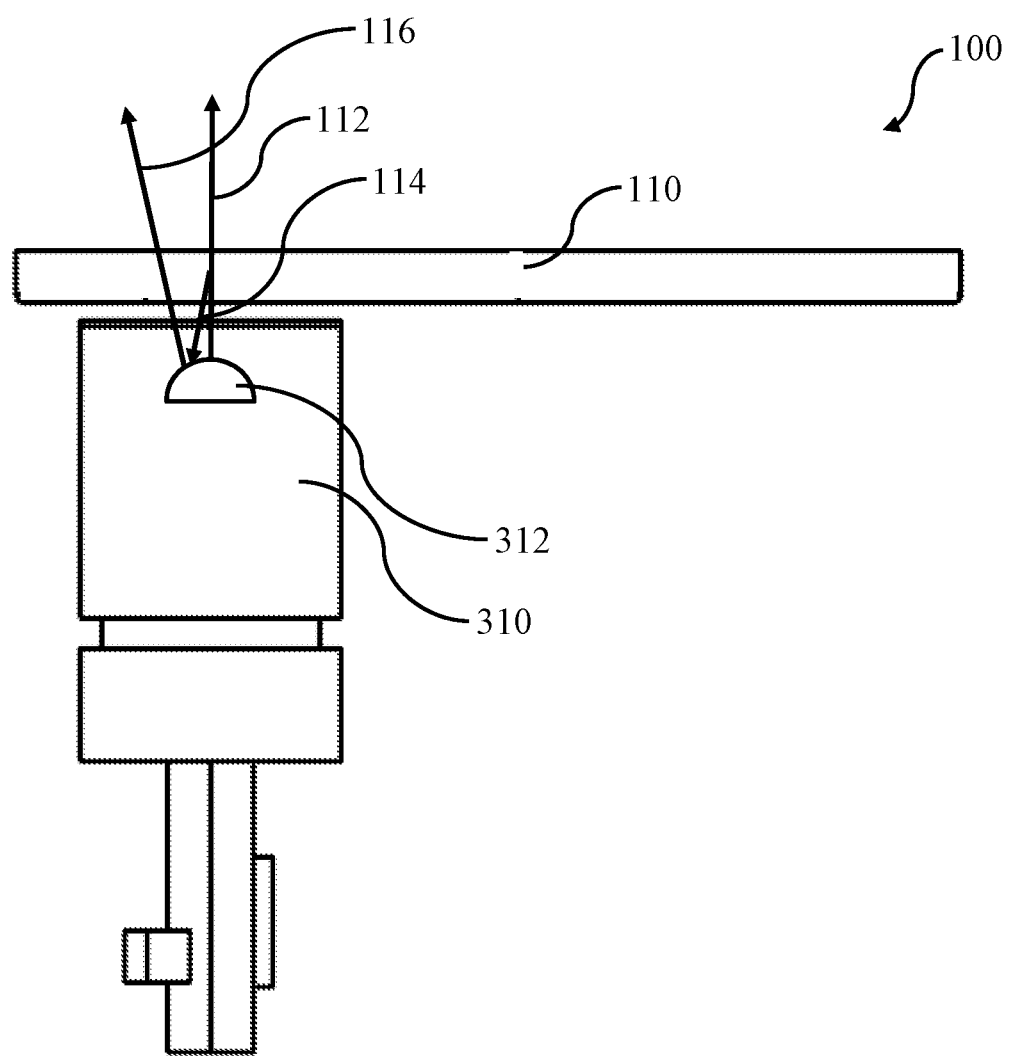
FIG. 1A is a side view of a prior art laser module and lens system, in accordance with the principles of the present disclosure.
Figure 1B:
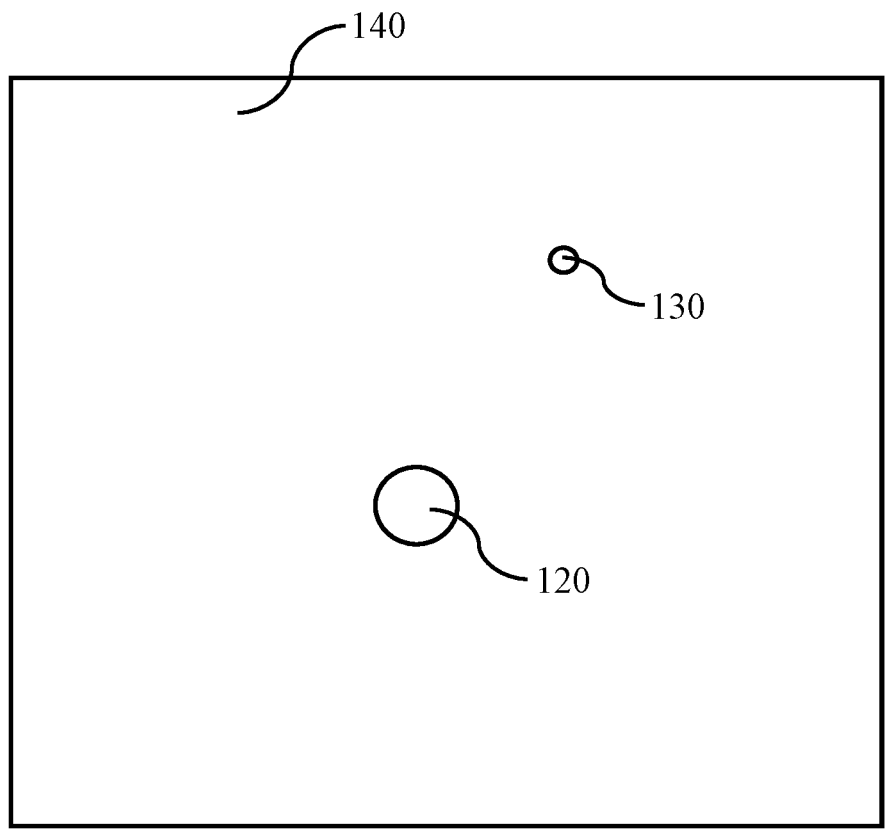
FIG. 1B is a top plan view of a surface being illuminated by the prior art laser module and lens system of FIG. 1A, in accordance with the principles of the present disclosure.
Figure 2B:
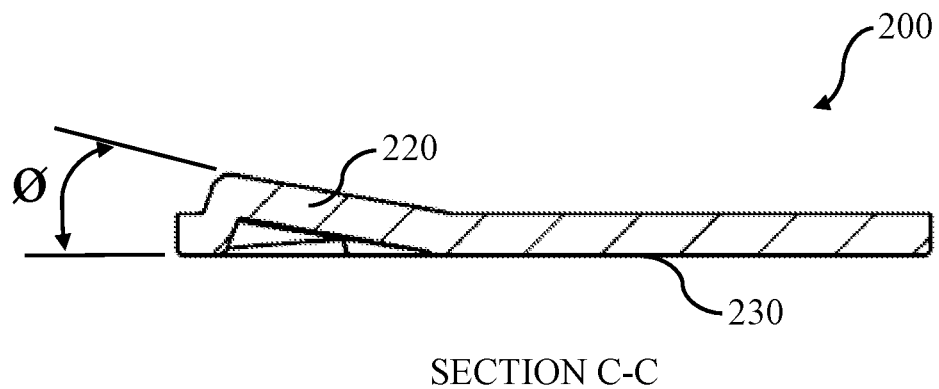
FIG. 2B is a cross-sectional view of the lens of FIG. 2A taken along line C-C, in accordance with the principles of the present disclosure.

FIG. 2B is a cross-sectional view of the lens 200 illustrated in FIG. 2A, taken along line C-C. As can be seen in FIG. 2B, the smaller diameter portion 220 of the lens 200 projects upward by an angle ø from the bottom surface 230 of the lens 200. Despite this upward projection, the thickness of the lens 200 is generally maintained at a uniform thickness throughout the lens 200. In some implementations, the angle ø is greater than about 6° for the lens 200. As a brief aside, and referring to FIG. 1A, in a prior art system 100 it has been found by the Assignee of the present disclosure that when a laser beam 112 exits the laser module 310 and hits the flat lens 110, a portion 114 of the emitted laser beam 112 will reflect off the flat lens 110. The reflected beam 114 then hits a lens 312 within the laser module 310 where it is reflected once again resulting in an extraneous beam 116 of light. This extraneous beam of light 116 results in the extraneous illumination 130 shown in FIG. 1B.

Figure 3A:
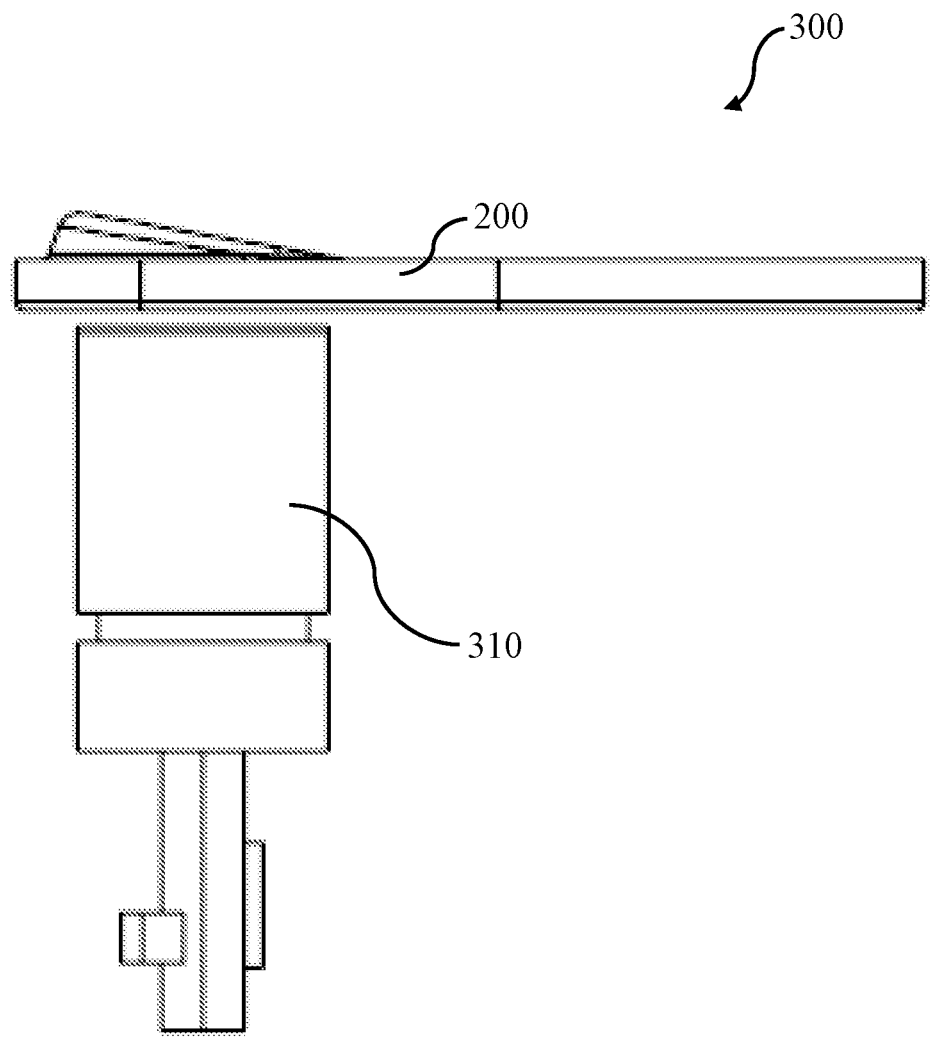
FIG. 3A is a side view of a laser module system that incorporates the lens of FIGS. 2A and 2B, in accordance with the principles of the present disclosure.
Figure 3B:
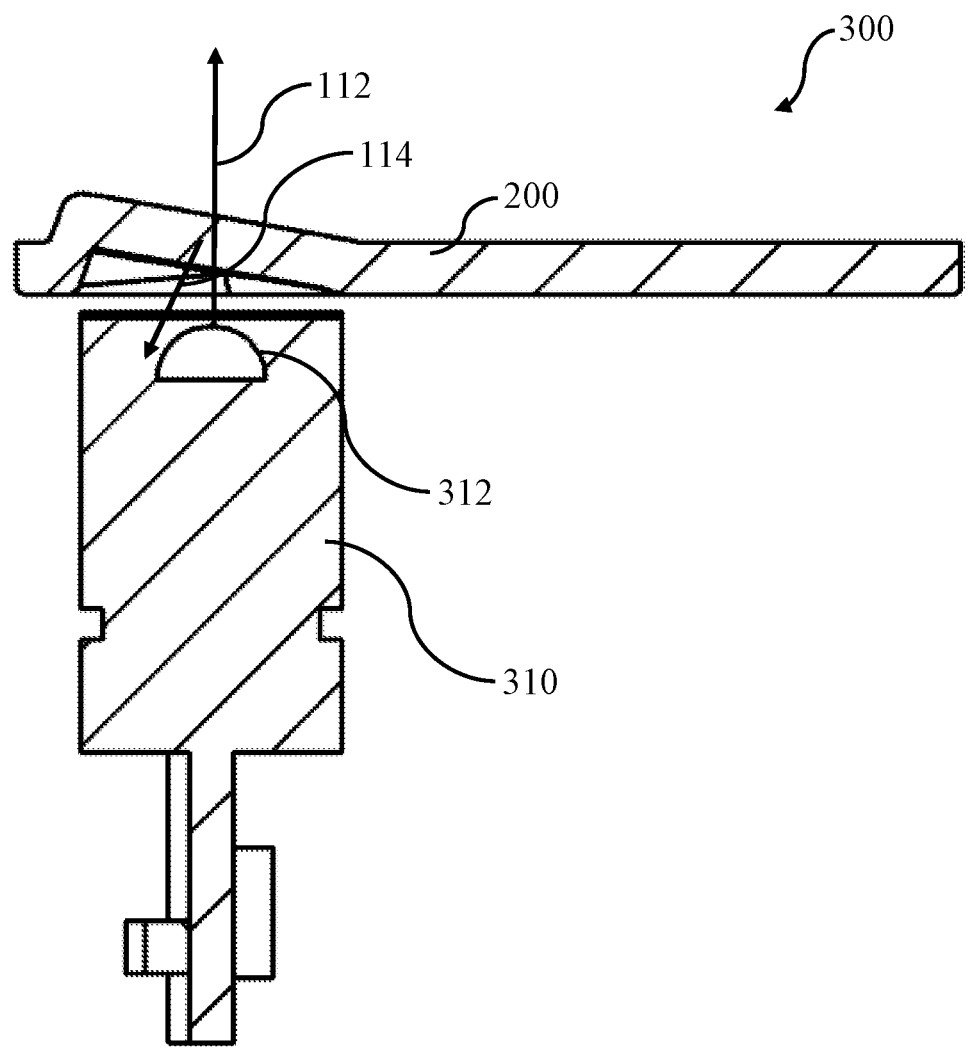
FIG. 3B is a cross-sectional view of the laser module system of FIG. 3A taken along line C-C, in accordance with the principles of the present disclosure.
Figure 3C:
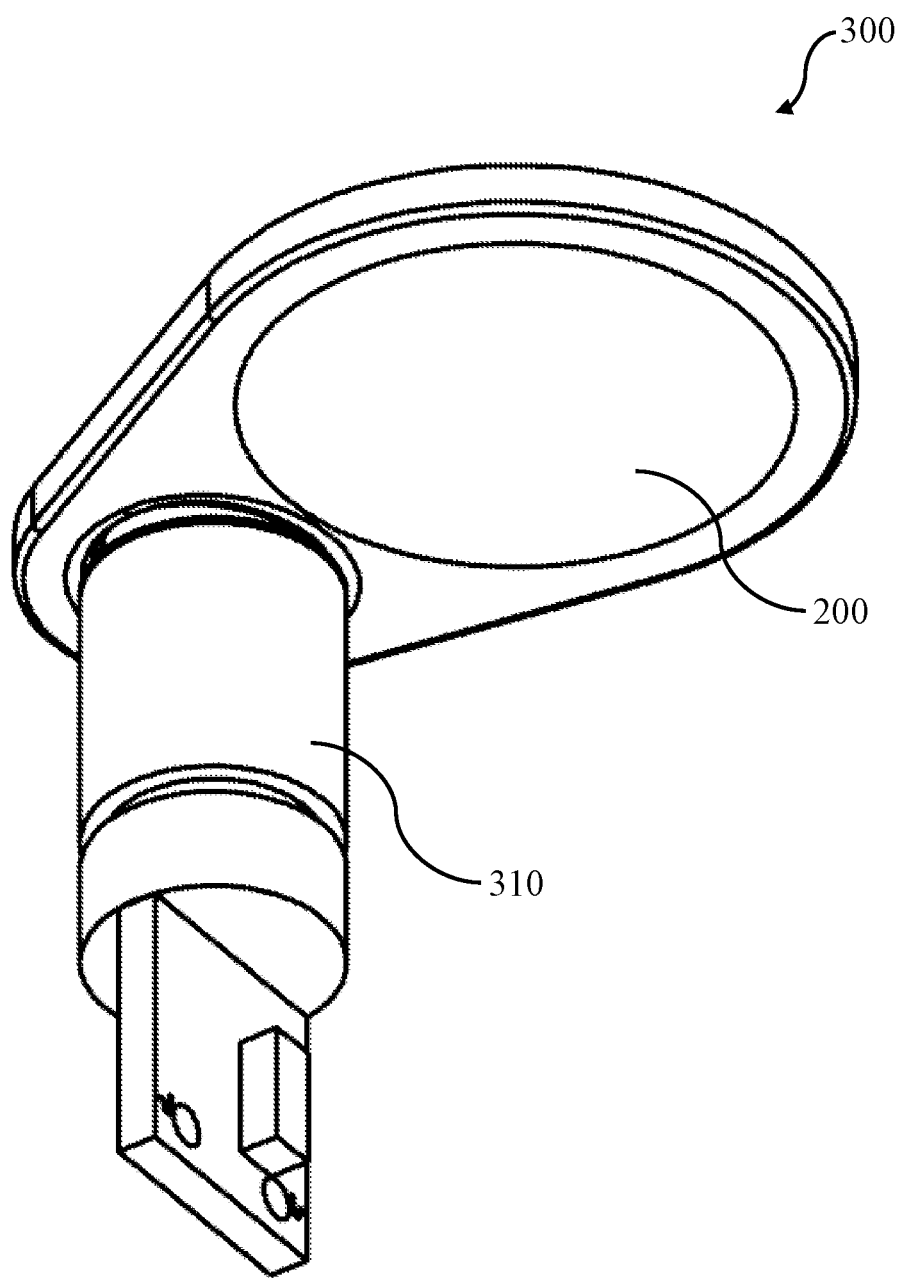
FIG. 3C is a perspective view of the laser module system of FIG. 3A in accordance with the principles of the present disclosure.
Figure 3D:
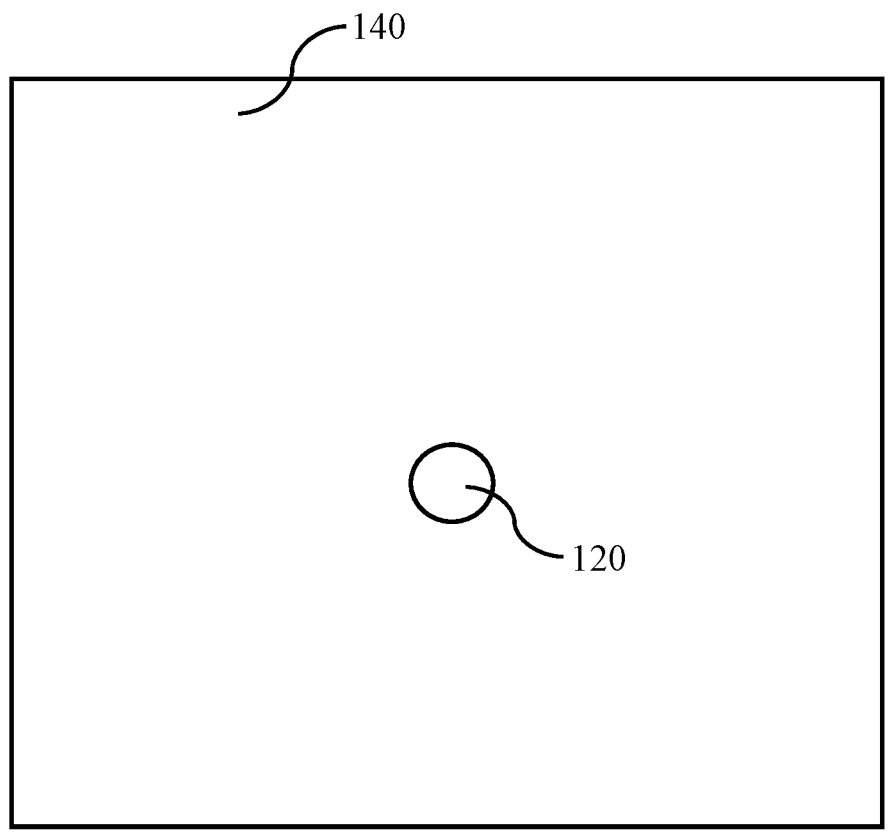
FIG. 3D is a top plan view of a surface being illuminated by the laser module system of FIGS. 3A-3C, in accordance with the principles of the present disclosure.

Referring now to FIG. 3B, the principles of the present disclosure can now be more readily seen. When a laser beam 112 exits the laser module 310, the beam of light will hit the lens 200, and specifically will hit the lens portion that is at an angle ø. A portion 114 of the laser beam 112 may reflect off the lens 200; however, any portion 114 of the laser beam that is reflected will be reflected at an angle that is wider than the lens 312 of the laser module 310. Accordingly, since the reflected laser beam 114 does not have an opportunity to reflect off of the lens 312 of the laser module 310, there will no longer be a secondary reflection. FIG. 3D illustrates a surface 140 that has been illuminated by the system shown in FIGS. 3A-3C. Specifically, the surface 140 has been illuminated by the laser module 310 which results in focused illumination 120. Due to the shape of the lens 200, there are no longer any extraneous illuminations as shown in FIG. 1B.

The precise angle ø for the lens 200 will be dependent upon, inter alia, the aperture size for the laser module 310. For example, an angle of approximately 6° may be adequate for a laser module 310 having an aperture that is roughly 2 mm in diameter. Other laser modules 310 may have apertures that are larger in size (e.g., >2 mm), while other laser modules 310 may have apertures that are smaller in size (e.g., <2 mm). Dependent upon the characteristics of the lens 200 and the aperture size for the laser module 310, the angle may vary from the specific implementation of 6°. For example, with larger aperture sizes for the laser module 310, the angle ø may be 7° or more. As but another non-limiting example, with smaller aperture sizes for the laser module 310, the angle ø may be 5° or less. These and other variants would be readily apparent to one of ordinary skill given the contents of the present disclosure.

In some variants, the lens may consist of a flat lens 110 such as that illustrated in FIG. 1A. However, in this variant, the laser module itself will be at an angle ø with respect to the flat lens 110. In such an implementation, there may be no need to modify the angle of the lens 110, rather the angle offset by the laser module 310 may accomplish similar functionality as to that described in FIGS. 3A-3C. In yet another variant, the angle ø of the lens 200 illustrated in, for example, FIG. 2B may be made smaller by angling the laser module 310. For example, the angle ø may be roughly 3° for the 2 mm aperture laser module 310. In such an implementation, the laser module 310 itself may also be angled offset from the bottom surface of the lens 200 such that the total angle of offset equals roughly 6°. These and other variants would be readily apparent to one of ordinary skill given the contents of the present disclosure.

It will be recognized that while certain aspects of the present disclosure are described in terms of specific design examples, these descriptions are only illustrative of the broader methods of the disclosure and may be modified as required by the particular design. Certain steps may be rendered unnecessary or optional under certain circumstances. Additionally, certain steps or functionality may be added to the disclosed embodiments, or the order of performance of two or more steps permuted. All such variations are considered to be encompassed within the present disclosure described and claimed herein.

While the above detailed description has shown, described, and pointed out novel features of the present disclosure as applied to various embodiments, it will be understood that various omissions, substitutions, and changes in the form and details of the device or process illustrated may be made by those skilled in the art without departing from the principles of the present disclosure. The foregoing description is of the best mode presently contemplated of carrying out the present disclosure. This description is in no way meant to be limiting, but rather should be taken as illustrative of the general principles of the present disclosure. The scope of the present disclosure should be determined with reference to the claims.

What is claimed is:

1. A laser module system, comprising:
   a light-emitting diode lighting apparatus;
   a laser module comprising a laser-emitting aperture of a first dimension; and
   a protective lens disposed over the light-emitting diode lighting apparatus and the laser module to produce a focused illumination from the laser module, the protective lens comprising:
   a smaller diameter portion configured to protect the laser module; and
   a larger diameter portion that is larger in size than the smaller diameter portion, the larger diameter portion being configured to protect the light-emitting diode lighting apparatus;
   wherein the smaller diameter portion is offset by an angle with respect to the larger diameter portion, the angle of offset being configured to eliminate extraneous reflections of light from the laser-emitting aperture of the laser module, the extraneous reflections of light comprising one or more illuminations that are distinct from the focused illumination, the angle of offset for the smaller diameter portion is sized to reflect light off the protective lens back towards the laser module outside of the first dimension of the laser-emitting aperture;
   wherein the angle of offset for the smaller diameter portion of the protective lens is selected as a function of a distance between the laser-emitting aperture and the protective lens and the first dimension of the laser-emitting aperture.

2. The laser module system of claim 1, wherein the protective lens is manufactured from one or more of: a transparent sticker, polycarbonate, poly (methyl methacrylate); and glass.

3. The laser module system of claim 1, wherein the first dimension of the laser-emitting aperture is 2 mm and the angle of offset is greater than 6°.

4. The laser module system of claim 1, wherein the protective lens comprises tangent lines that join a circumference of the smaller diameter portion of the protective lens with a circumference of the larger diameter portion of the protective lens.

5. The laser module system of claim 4, wherein the first dimension of the laser-emitting aperture is 2 mm and the angle of offset is greater than 6°.

6. The laser module system of claim 1, wherein the laser-emitting aperture comprises a second lens.

7. The laser module system of claim 6, wherein the angle of offset for the smaller diameter portion is sized to reflect light off the protective lens back towards the laser module outside of the second lens.

8. The laser module system of claim 7, wherein a size of the second lens is 2 mm in diameter and the angle of offset is greater than 6°.

9. A laser module system, comprising:
   a light-emitting diode lighting apparatus;
   a laser module comprising a laser-emitting aperture of a first dimension, the laser-emitting aperture comprising a second lens; and
   a protective lens disposed over the light-emitting diode lighting apparatus and the laser module to produce a focused illumination from the laser module, the protective lens comprising:
   a smaller diameter portion configured to protect the laser module; and
   a larger diameter portion that is larger in size than the smaller diameter portion, the larger diameter portion being configured to protect the light-emitting diode lighting apparatus;
   wherein the smaller diameter portion is offset by an angle with respect to the larger diameter portion, the angle of offset being configured to eliminate extraneous reflections of light from the laser-emitting aperture of the laser module, the extraneous reflections of light comprising one or more illuminations that are distinct from the focused illumination.

10. The laser module system of claim 9, wherein the angle of offset for the smaller diameter portion is sized to reflect light off the protective lens back towards the laser module outside of the first dimension of the laser-emitting aperture.

11. The laser module system of claim 10, wherein the protective lens is manufactured from one or more of: a transparent sticker, polycarbonate, poly (methyl methacrylate); and glass.

12. The laser module system of claim 10, wherein the first dimension of the laser-emitting aperture is 2 mm and the angle of offset is greater than 6°.

13. The laser module system of claim 10, wherein the protective lens comprises tangent lines that join a circumference of the smaller diameter portion of the protective lens with a circumference of the larger diameter portion of the protective lens.

14. The laser module system of claim 13, wherein the angle of offset for the smaller diameter portion of the protective lens is selected as a function of a distance between the laser-emitting aperture and the protective lens and the first dimension of the laser-emitting aperture.

15. The laser module system of claim 14, wherein the first dimension of the laser-emitting aperture is 2 mm and the angle of offset is greater than 6°.

16. The laser module system of claim 9, wherein the angle of offset for the smaller diameter portion is sized to reflect light off the protective lens back towards the laser module outside of the second lens.

17. The laser module system of claim 16, wherein a size of the second lens is 2 mm in diameter and the angle of offset is greater than 6°.

* * * * *